(12) United States Patent
Chen

(10) Patent No.: US 6,646,872 B1
(45) Date of Patent: Nov. 11, 2003

(54) MOUNTING APPARATUS FOR DATA STORAGE DEVICE

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/286,717

(22) Filed: Nov. 1, 2002

(30) Foreign Application Priority Data

Jul. 26, 2002 (TW) ...................................... 91211439 U

(51) Int. Cl.[7] ................................................. G06F 1/16
(52) U.S. Cl. ........................ 361/685; 361/724; 361/725; 312/223.1; 312/223.2
(58) Field of Search ................................ 361/683–725; 312/223.1, 223.2

(56) References Cited

U.S. PATENT DOCUMENTS

| | | | | |
|---|---|---|---|---|
| 5,995,364 A | * | 11/1999 | McAnally et al. | .......... 361/685 |
| 6,053,586 A | * | 4/2000 | Cook et al. | .............. 312/223.2 |
| 6,125,031 A | * | 9/2000 | Della Fiora et al. | ........ 361/683 |
| 6,337,793 B1 | * | 1/2002 | Vier et al. | .................. 361/683 |

* cited by examiner

*Primary Examiner*—Darren Schuberg
*Assistant Examiner*—Anthony Q. Edwards
(74) *Attorney, Agent, or Firm*—Wei Te Chung

(57) ABSTRACT

A data storage device mounting apparatus includes: a front panel (20) defining two openings (21, 22); two drive brackets (30, 40) each comprising a top panel (32), a bottom panel (31, 41), and a side panel (33, 43); and a cover (60). Hollow protrusions (24) are inwardly arranged at one side of the openings. Flanges (38, 48) defining catch openings (382, 482) and slits (386, 486) depend from the top and bottom panels. The cover includes two vertical plates (62, 63) each having a bent plate (64). Each bent plate includes tabs (644). Hooks (66) and resilient clasps (68) are inwardly formed from the vertical plates. After the drive brackets are attached to the front panel at the openings, the tabs engage in the hollow protrusions, and the hooks and the resilient clasps are respectively engagingly received in the slits and the catch openings.

19 Claims, 6 Drawing Sheets

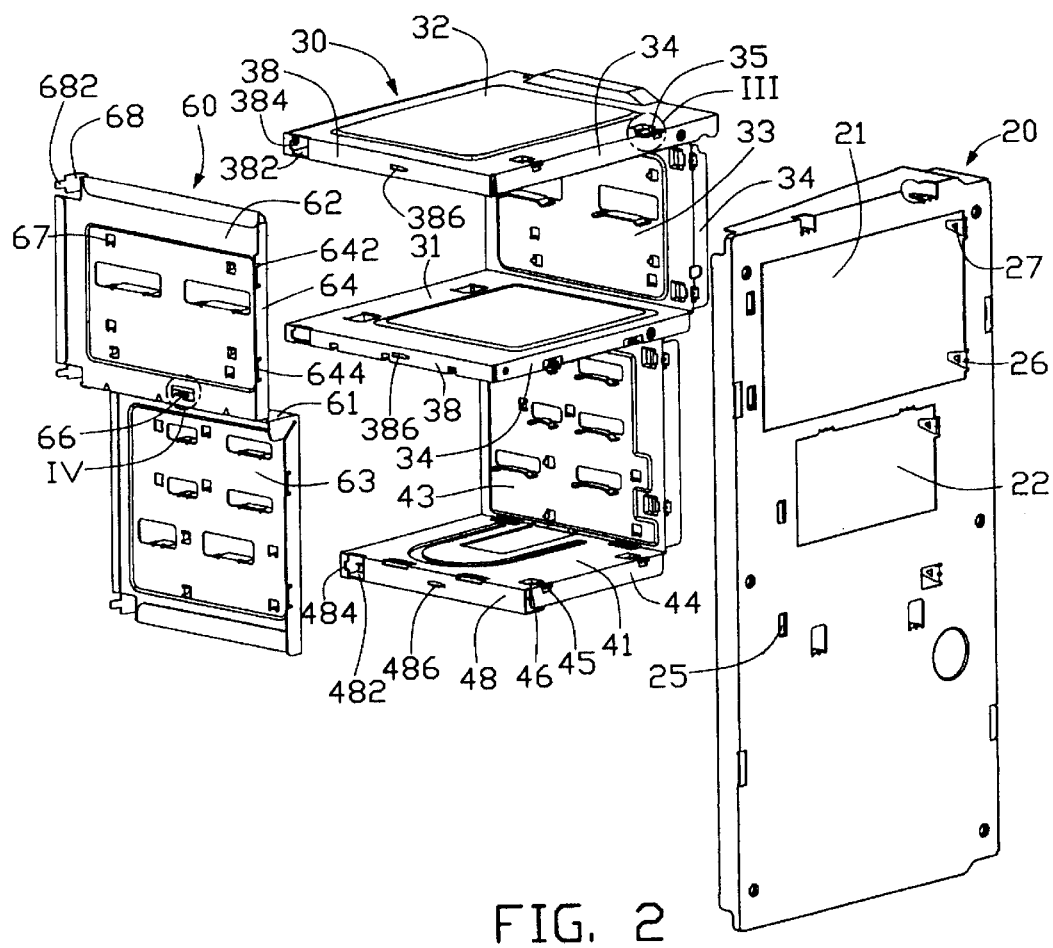
FIG. 2
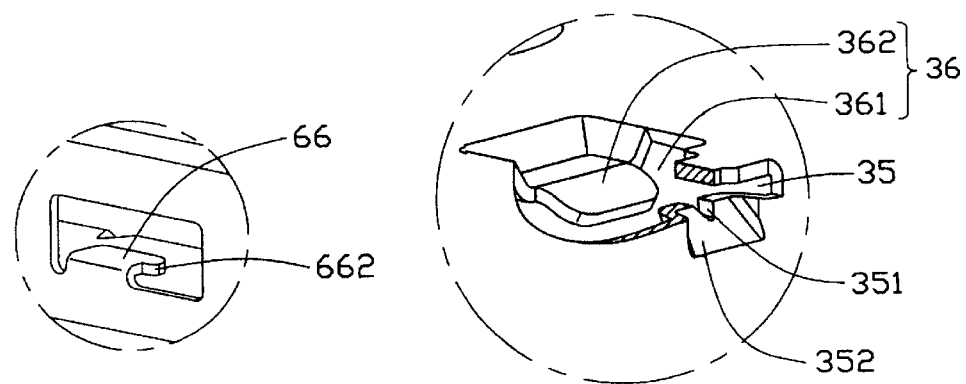
FIG. 4
FIG. 3

MOUNTING APPARATUS FOR DATA STORAGE DEVICE

BACKGROUND OF THE INVENTION

1. Field of the Invention

The present invention relates to a computer enclosure, and particularly to a computer enclosure having a mounting apparatus for readily attaching data storage devices to the enclosure.

2. Related Art

When a conventional computer is assembled, a drive bracket is firstly mounted in a computer enclosure. Data storage devices such as a hard disk drive (HDD), a floppy disk drive (FDD) and a compact disk read only memory (CD-ROM) drive are then attached to the drive bracket.

The drive bracket is typically secured to the computer enclosure by riveting or using a plurality of screws. U.S. Pat. No. 5,447,367 discloses a conventional drive bracket which is attached to a computer enclosure with screws. A screwdriver is required. This is inconvenient and time-consuming, and particularly costly in mass production facilities. Furthermore, during assembly, extra operation space for manipulating the screws is needed. This militates against the modern trend toward reducing the size of a computer. Moreover, screws can be accidentally lost during assembly. Similar problems are experienced when rivets are used instead of screws. A riveter is required, and extra operation space for manipulating the rivets is needed. Rivets can be accidentally lost during assembly.

Thus an improved mounting apparatus for data storage devices which overcomes the above-mentioned problems is desired.

SUMMARY OF THE INVENTION

Accordingly, an object of the present invention is to provide an apparatus for easy and convenient installation and removal of computer data storage devices.

Another object of the present invention is to provide a computer data storage device mounting apparatus which does not require additional fasteners for attachment of a computer data storage device in a computer enclosure.

To achieve the above-mentioned objects, a mounting apparatus in accordance with a preferred embodiment of the present invention includes a front panel, first and second drive brackets, and a cover. First and second openings are defined in the front panel, corresponding to the first and second drive brackets. A plurality of hollow protrusions is inwardly arranged on the front panel at one side of the first and second openings. The first and second drive brackets each comprise a top panel, a bottom panel and a side panel. A flange depends from an edge portion of each of the top and bottom panels of the first drive bracket nearest the cover, and from an edge portion of the bottom panel of the second drive bracket nearest the cover. Each flange defines a catch opening and a slit. The cover comprises first and second vertical plates. An edge portion of each first and second vertical plate nearest the front panel is bent perpendicularly to respectively form a pair of bent plates. Each bent plate includes a pair of tabs. A plurality of hooks and resilient clasps are inwardly formed from the first and second vertical plates. The first and second drive brackets are attached to the front panel at the first and second openings. The tabs of the cover engage in the hollow protrusions of the front panel. The hooks and the resilient clasps of the cover are respectively engagingly received in the slits and the catch openings of the first and second drive brackets. The cover is thereby securely attached to the front panel and the first and second drive brackets.

Other objects, advantages and novel features of the present invention will be drawn from the following detailed description of the preferred embodiment of the present invention with attached drawings, in which:

BRIEF DESCRIPTION OF THE DRAWINGS

FIG. 2 is similar to FIG. 1, but viewed from another aspect;

FIG. 3 and FIG. 4 are respective enlarged views of circled portions III and IV of FIG. 2;

DESCRIPTION OF THE PREFERRED EMBODIMENT

Figure 1:
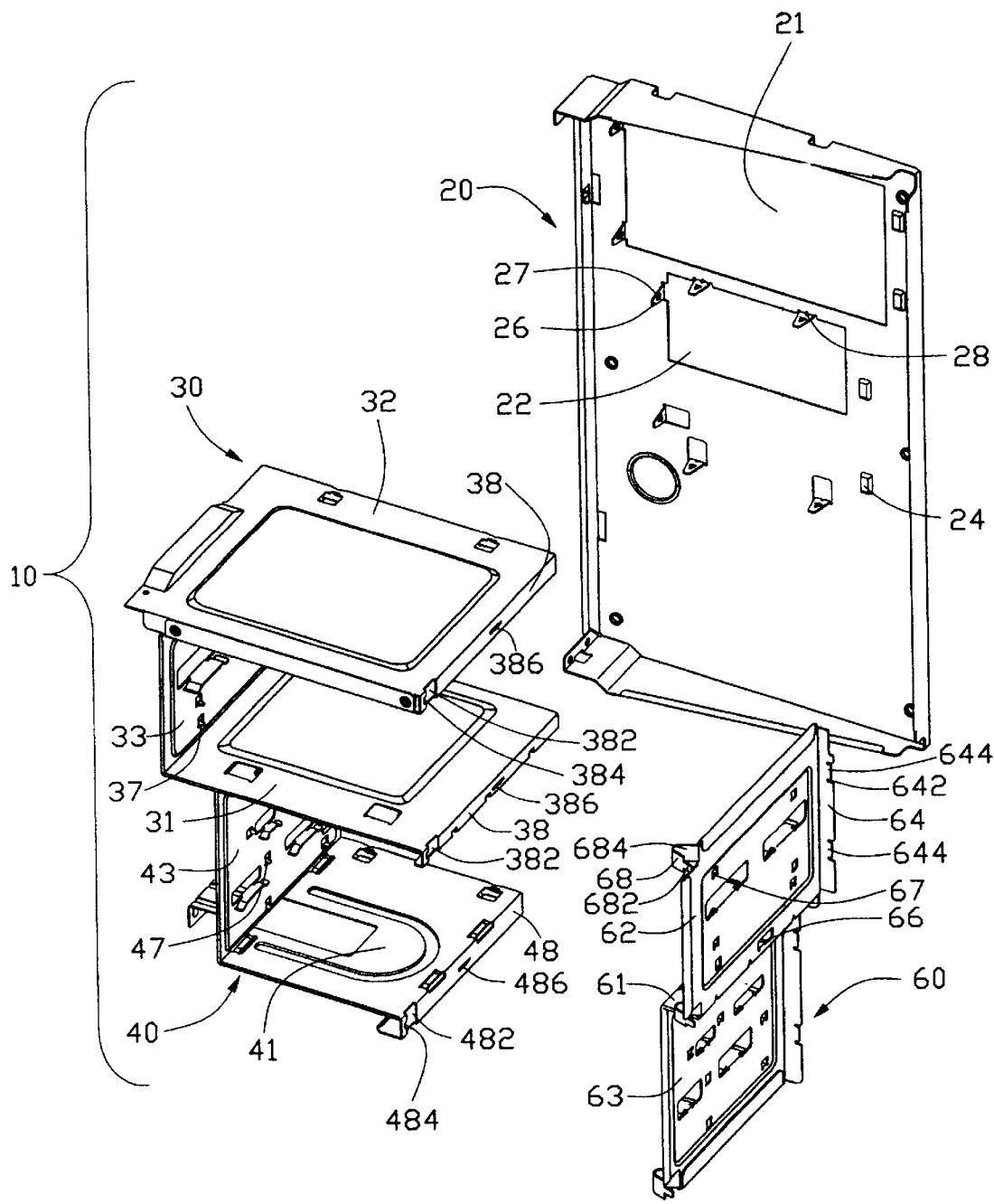
FIG. 1 is an exploded isometric view of a data storage device mounting apparatus in accordance with a preferred embodiment of the present invention.
Figure 5:
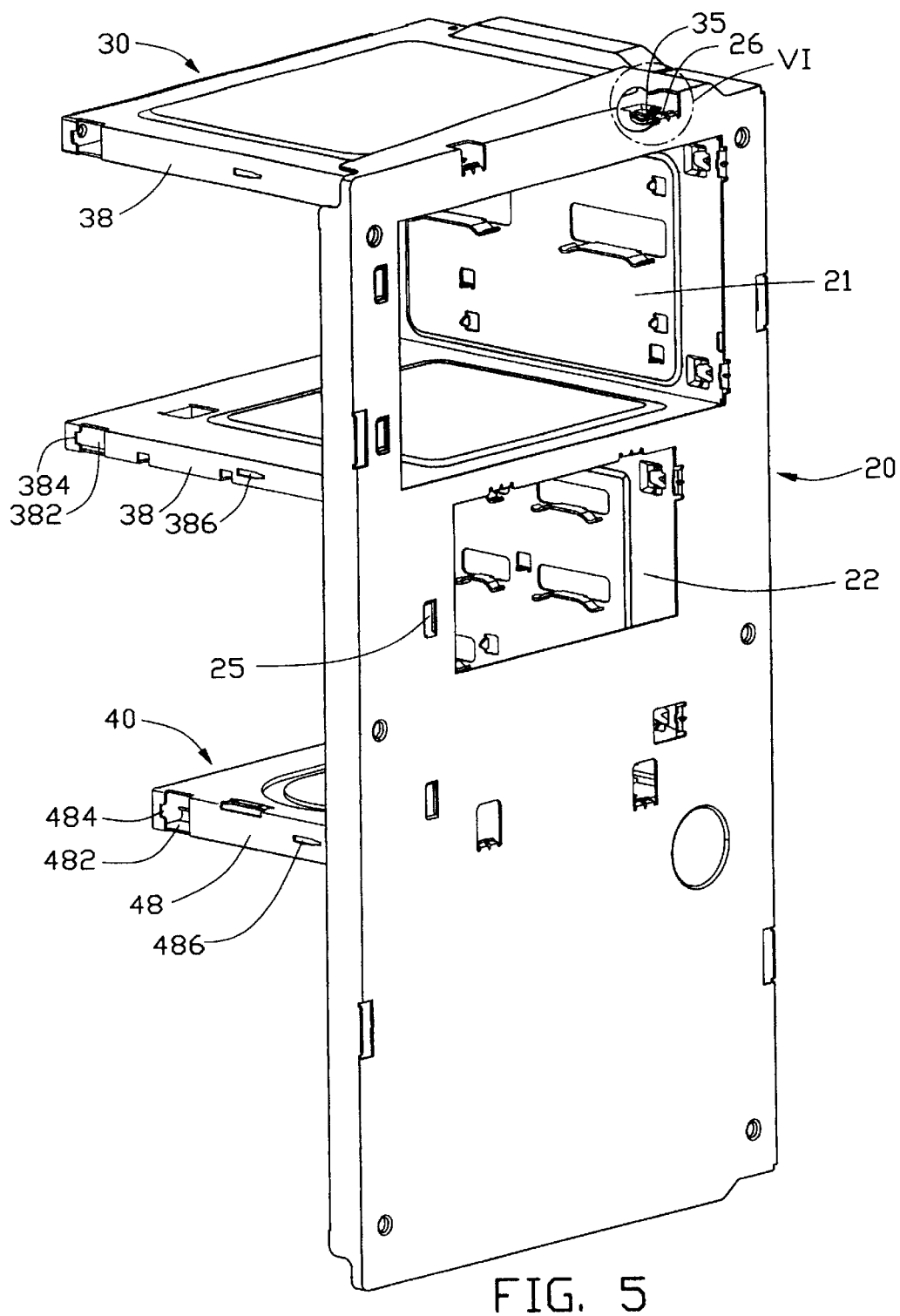
FIG. 5 is an enlarged partly assembled view of FIG. 2.

Referring to FIGS. 1 and 2, a data storage device mounting apparatus 10 in accordance with a preferred embodiment of the present invention includes: a front panel 20 for attaching to a chassis (not shown) of a computer (not shown); a first drive bracket 30 and a second drive bracket 40 for attaching to the front panel 20; and a cover 60 for attaching to the front panel 20, the first drive bracket 30 and the second bracket 40.

Figure 6:
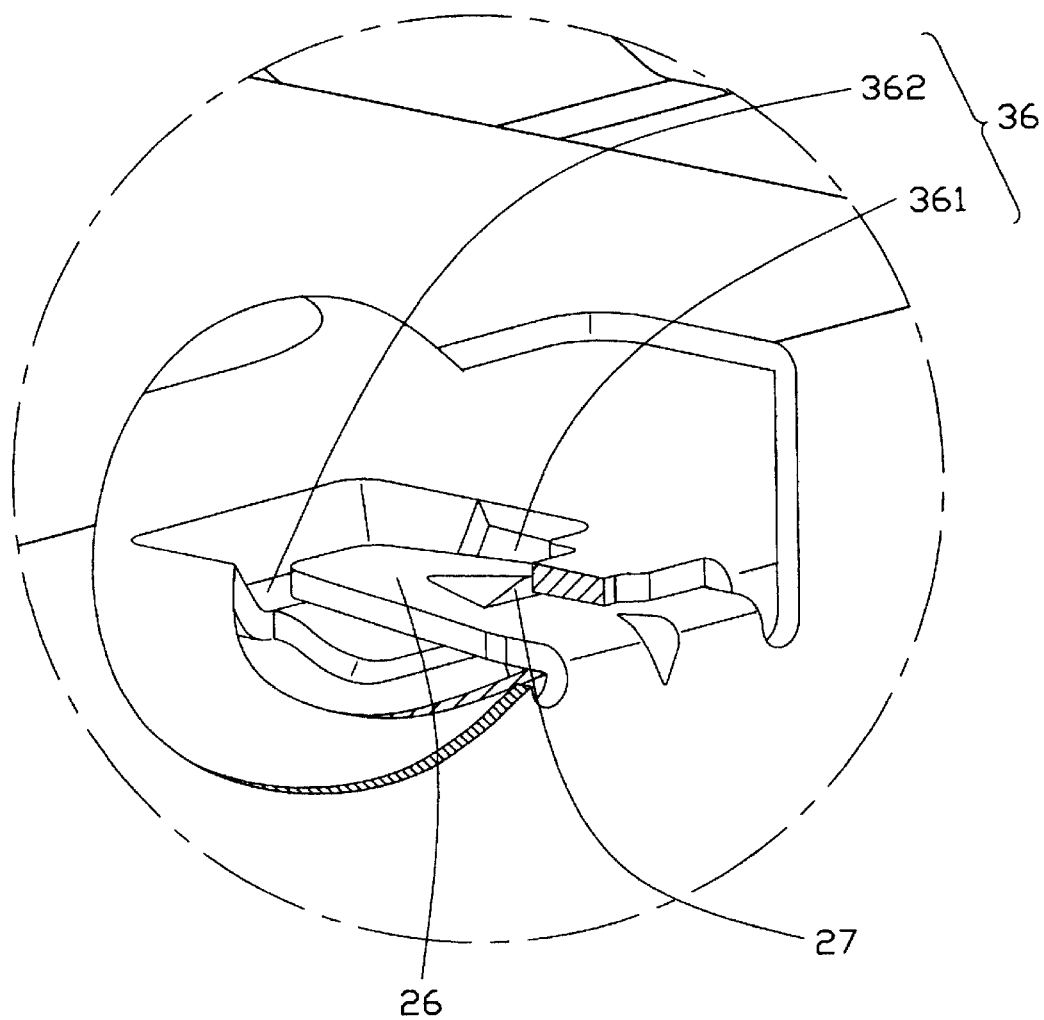
FIG. 6 is an enlarged view of a circled portion VI of FIG. 5.
Figure 7:
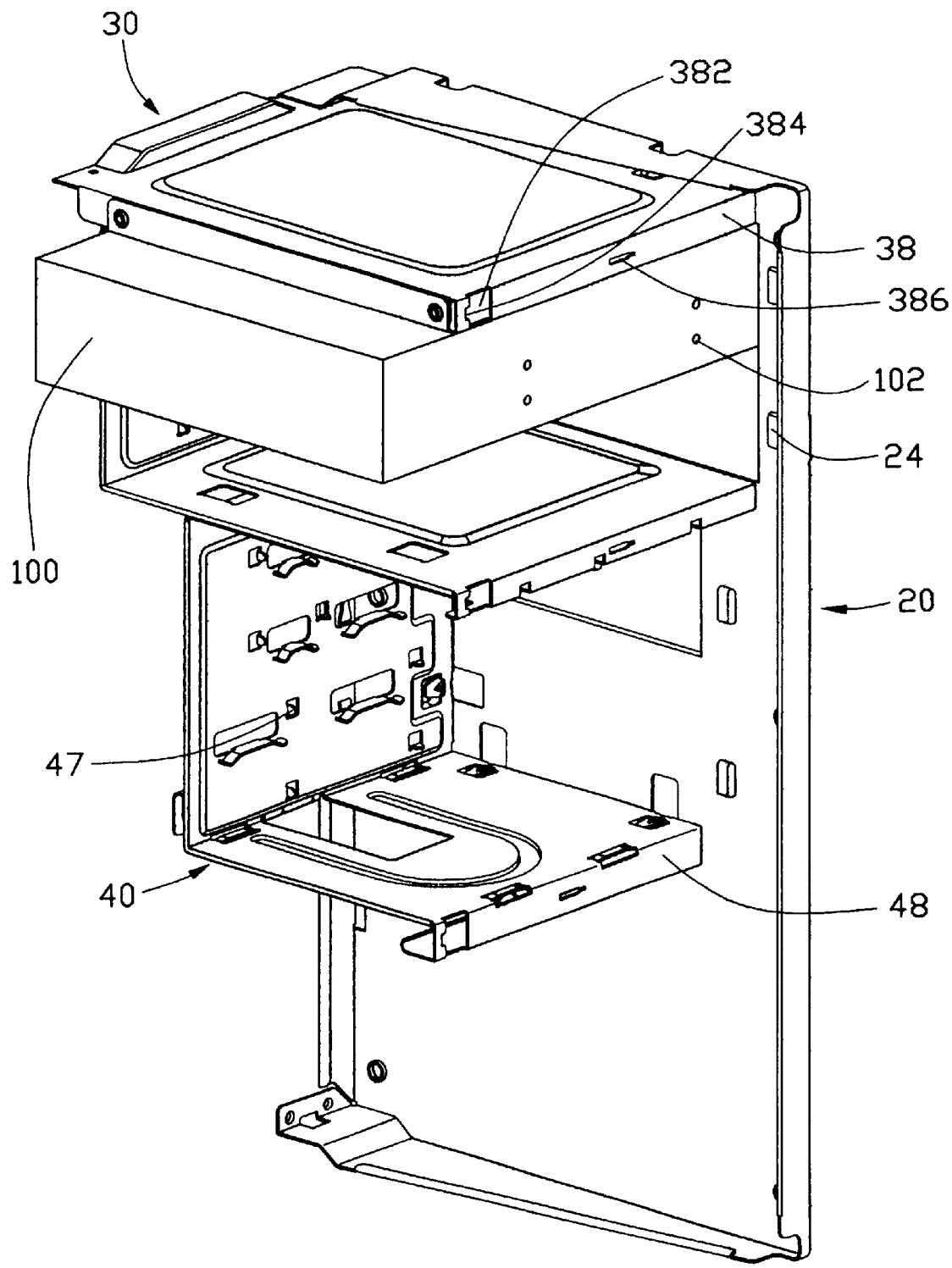
FIG. 7 is similar to FIG. 5, but viewed from another aspect, and showing a data storage device installed in the data storage device mounting apparatus.
Figure 8:
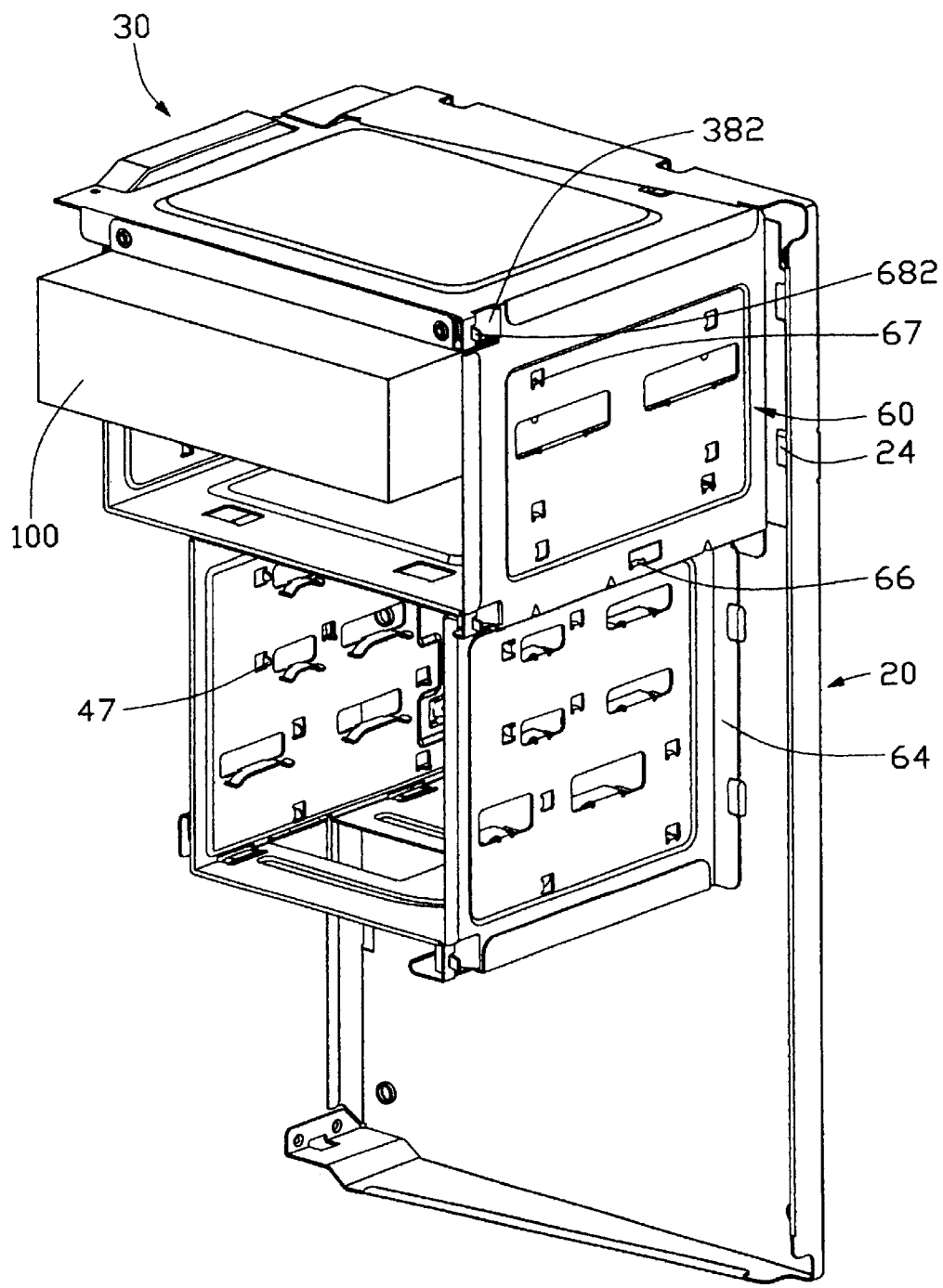
FIG. 8 is similar to FIG. 7, but showing the data storage device mounting apparatus fully assembled.

The front panel 20 defines a first opening 21 in a top portion thereof, and a second opening 22 below the first opening 21. The front panel 20 at one side of the first opening 21 and the second opening 22 is stamped inwardly to form a plurality of hollow protrusions 24. Each protrusion 24 includes an open side 25 that is nearest the first and second openings 21, 22. A plurality of generally trapezoid clips 26 extends inwardly from the front panel 20 at the first opening 21 and second opening 22. In the preferred embodiment, the clips 26 are located at an opposite side of the first opening 21 and the second opening 22, at a top extremity of the first opening 21, at top extremity of the second opening 22, and below the second opening 22. Referring also to FIG. 6, each clip 26 forms a low-profile generally triangular projection 27 on a middle portion of an upper face thereof, and a small block 28 on a proximal portion of a lower face thereof.

The first drive bracket 30 comprises a first bottom panel 31, a first top panel 32, and a first side panel 33 extending vertically between the first bottom and top panels 31, 32. The first bottom, top and side panels 31, 32, 33 cooperatively define a space (not labeled) therebetween for receiving data storage devices (not shown).

A first bent plate 34 extends perpendicularly from respective front edges of each of the first bottom, top and side panels 31, 32, 33. A pair of spaced slots 35 is defined in the first bent plate 34 of each of the first top panel 32 and first side panel 33, corresponding to the clips 26 at the first opening 21 of the front panel 20. As best seen in FIG. 3, the first bent plate 34 at each slot 35 is stamped inwardly to form a slanted portion 352, for facilitating insertion of the corresponding clip 26 into the slot 35. A V-shaped notch 351 is defined in a middle of a free edge of the slanted portion 352. A portion of each of the first top panel 32 and first side panel 33 near each slot 35 is stamped to form a recessed portion 36. A cutout 361 is defined in one end of each recessed portion 36 that is nearest the first bent plate 34. A guide slant 362 of the recessed portion 36 extends into the cutout 361. A pair of spaced gateways (not labeled) is defined in the first bent plate 34 of the first bottom panel 31.

A pair of flanges 38 depends from respective free edges of each of the first bottom and top panels 31, 32 which are distal from the first side panel 33. A pair of catch openings 382 is respectively defined in rearmost ends of the flanges 38. Each catch opening 382 comprises a rearmost narrow portion 384. A pair of slits 386 is respectively defined in middle portions of the flanges 38. A plurality of positioning pins 37 extends inwardly from the first side panel 33.

The second drive bracket 40 is located below the first drive bracket 30, and comprises a second top panel (not visible), a second side panel 43 and a second bottom panel 41. The second top panel, second side panel 43 and second bottom panel 41 each have second bent plates 44, slots 45 and recessed portions 46. The second bottom panel 41 further includes a flange 48. A catch opening 482 and a slit 486 are defined in the flange 48. The catch opening 482 comprises a rearmost narrow portion 484. The second side panel 43 further includes a plurality of positioning pins 47. The second bent plates 44, slots 45, recessed portions 46, flange 48, catch opening 482, narrow portion 484, slit 486 and positioning pins 47 are respectively configured similarly to the first bent plates 34, slots 35, recessed portions 36, flanges 38, catch openings 382, narrow portions 384, slits 386 and positioning pins 37 of the first drive bracket 30.

The cover 60 includes a horizontal plate 61, a first vertical plate 62 extending upwardly from one side of the horizontal plate 61, and a second vertical plate 63 depending from an opposite side of the horizontal plate 61.

A third bent plate 64 extends perpendicularly from respective front edges of each of the horizontal plate 61 and the first and second vertical plates 62, 63. A plurality of pairs of splits 642 is defined in the third bent plate 64 of each of the first and second vertical plates 62, 63 respectively. A tab 644 is formed between each pair of splits 642, for insertion into the open side 25 of the corresponding protrusion 24 of the front panel 20. A hook 66 is inwardly formed from a top portion of the first vertical plate 62, a bottom portion of the first vertical plate 62, and a bottom portion of the second vertical plate 63 (only one hook 66 is visible in each of FIGS. 1 and 2). The hooks 66 are for engaging in the corresponding slits 386, 486 of the first and second drive brackets 30, 40. As best seen in FIG. 4, each hook 66 is generally L-shaped, and has an end part 662. A resilient clasp 68 extends inwardly from each of a top rear portion of the first vertical plate 61, a bottom rear portion of the first vertical plate 61, and a bottom rear portion of the second vertical plate 62. The clasps 68 are for being engagingly received in the corresponding catch openings 382, 482 of the first and second drive brackets 30, 40. Each clasp 68 includes a U-shaped main part 684 and a narrow terminal 682. A plurality of positioning pins 67 extends inwardly from the first and second vertical plates 62, 63.

Referring to FIGS. 5–8, assembly of the mounting apparatus 10 is described below in conjunction with a data storage device 100 such as a hard disk drive (HDD) 100. The HDD 100 defines a plurality of positioning holes 102 in opposite sides thereof. The first and second drive brackets 30, 40 are firstly placed behind the front panel 20 at the first and second openings 21, 22 respectively. The first and second drive brackets 30, 40 are pushed forwardly, so that the clips 26 of the front panel 20 engage in the corresponding slots 35, 45 of the first and second drive brackets 30, 40. Each clip 26 enters the corresponding recessed portion 36 (46) along the guide slant 362. Finally, the small block 28 of each clip 26 engages in the notch 351 at the corresponding slot 35 (45), and the projection 27 of each clip 26 snappingly engages in the cutout 361 of the corresponding recessed portion 36 (46). Thus, the clips 26 are respectively engagingly received in the corresponding recessed portions 36, 46 of the first and second drive brackets 30, 40. Accordingly, the first and second drive brackets 30, 40 are securely attached to the front panel 20 at the first and second openings 21, 22.

Then the combined front panel 20 and first and second drive brackets 30, 40 is turned on its side so that the first and second side panels 33, 43 are bottommost. This facilitates installation of the HDD 100. The HDD 100 is placed in the space between the first bottom panel 31, the first top panel 32 and the first side panel 33, with the positioning holes 102 of one side of the HDD 100 being adjacent the positioning pins 37 of the first side panel 33. The HDD 100 is then pushed downwardly, so that the positioning pins 37 respectively engage in said positioning holes 102.

Then the tabs 644 of the cover 60 are respectively inserted into the open sides 25 of the protrusions 24 of the front panel 20, with opposite ends of the protrusions 24 engaging in the splits 642 of the cover 60. The cover 60 is pivoted toward the HDD 100 about the tabs 644. Once the cover 60 abuts the first and second drive brackets 30, 40, the cover 60 is pulled backwardly so that the hooks 66 of the cover 60 align with the corresponding slits 386, 486 of the first and second drive brackets 30, 40. The cover 60 is pivoted further toward the HDD 100 until the end parts 662 of the hooks 66 are respectively received in the slits 386, 486. The cover 60 is pushed forwardly a short distance until the third bent plates 64 abut against the front panel 20. As a result, the end parts 662 of the hooks 66 move forwardly and are engagingly received in the slits 386, 486. The terminal 682 of the clasp 68 at the top of the first vertical plate 62 is pressed forwardly and inwardly. The main part 684 of said clasp 68 is received in the catch opening 382 of the first top panel 32. The terminal 682 is released, and engages in the narrow portion 384 of the catch opening 382. Said clasp 68 is thus engagingly received in the catch opening 382 of the flange 38 of the first top panel 32, with a portion of the terminal 682 protruding outside said flange 38. In the same way, the clasps 68 at the bottoms of the first and second vertical plates 62, 63 are respectively engagingly received in the corresponding catch openings 382, 384 of the first and second drive brackets 30, 40. Simultaneously, the positioning pins 67 of the cover 60 engage in the positioning holes 102 of the opposite side of the HDD 100. The HDD 100 is thus securely installed in the combined front panel 20 and first and second drive brackets 30, 40.

To remove the HDD 100, the combined front panel 20 and first and second drive brackets 30, 40 is turned on its side so that the first and second side panels 33, 43 are bottom most. The protruding portions of the terminals 682 of the clasps 68 are pushed forwardly and pulled outwardly, so that the clasps 68 are freed from the catch openings 382, 482. The cover 60 is pulled rearwardly and pivoted outwardly, so that the hooks 66 of the cover 60 are released from the slits 386, 486, and the positioning pins 67 of the cover 60 are disengaged from the positioning holes 102 of the HDD 100. The cover 60 is removed from the front panel 20. The HDD 100 is then easily removed.

In the mounting apparatus 10 of the present invention, the clips 26 of the front panel 20 are engagingly received in the recessed portions 36, 46 of the first and second drive brackets 30, 40. In addition, the tabs 644 of the cover 60 are extended through the open sides 25 of the protrusions 24 of the front panel 20 to be engaged with the protrusions 24. Thus, the first and second drive brackets 30, 40 are securely attached to the front panel 20 without any need for screws. Furthermore, the cover 60 is separable from and manually attachable to the first and second drive brackets 30, 40. This makes it easy to install and remove data storage devices 100.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for a data storage device, the mounting apparatus comprising:
   a panel defining an opening and comprising a plurality of protrusions arranged at one side of the at least one opening, each of the protrusions comprising an open side nearest the at least one opening;
   a drive bracket located behind the opening, the drive bracket comprising a plurality of plates defining a space therebetween adapted for receiving the data storage device therein, at least one of the plates defining a catch opening therein; and
   a cover comprising a plurality of tabs arranged near the front panel and extending into the open sides of the protrusions thereby pivotably attaching the cover to the panel, and least one clasp engaging in the catch opening of said at least one of the plates thereby attaching the cover to the drive bracket.

2. The mounting apparatus as described in claim 1, wherein the at least one clasp comprises a narrow terminal, and the catch opening of said at least one of the plates has a narrow portion, the narrow portion engagingly receiving the narrow terminal.

3. The mounting apparatus as described in claim 1, wherein the at least one of the plates further defines at least one slit at the edge portion thereof, and the cover flier comprises at least one hook, the at least one hook being engagingly received in the at least one slit.

4. The mounting apparatus as described in claim 3, wherein the at least one hook, is generally L-shaped and comprises an end part engaging with the at least one of the plates.

5. The mounting apparatus as described in claim 1, wherein a pair of splits is defined at opposite ends of each of the tabs, opposite ends of the protrusions engaging in the splits.

6. The mounting apparatus as described in claim 1, wherein the panel further comprises a plurality of generally trapezoid clips formed around the opening thereof, and the drive bracket further defines a plurality of slots in the plurality of plates, the slots engagingly receiving the clips therein.

7. The mounting apparatus as described in claim 6, wherein a plurality of recessed portions is formed in the plurality of panels near each of the slots, each of the recessed portions defines a cutout and comprises a guide slant extending into the cutout, a projection is formed on each of the clips, the projection engaging with the drive bracket at a corresponding cutout thereof.

8. The mounting apparatus as described in claims 7, wherein the drive bracket comprises a plurality of slanted portions respectively formed at the slots, a notch is defined in each of the slanted portions, and each of the clips comprises a small block engagingly received in a corresponding notch.

9. The mounting apparatus as described in claim 1, wherein the dive bracket and the cover comprise means for positioning the data storage device in the mounting apparatus.

10. A mounting apparatus for least one data storage devices, the mounting apparatus comprising:
    a front panel defining at least one opening therein,
    at least one drive bracket adapted for receiving the at least one data storage device therein, and comprising a top panel, a bottom panel, and a side panel, the at least one drive bracket defining a slit and a catch opening in at least one of the top and bottom panels; and a cover detachably attached to the front panel, the cover comprising a hook corresponding to the slit and a clasp corresponding to the catch opening;
    wherein when the clasp is engaged in the catch opening, the cover is resiliently pushed toward the front panel to thereby cause the hook to be engagingly received in the slit.

11. The mounting apparatus for at least one data storage device as described in claim 10, wherein the clasp has a generally U-shaped structure.

12. The mounting apparatus for at least one data storage device as described in claim 11, wherein the clasp comprises a narrow terminal, and the catch opening has a narrow portion engagingly receiving the narrow terminal.

13. The mounting apparatus for at least one data storage device as described in claim 10, wherein the front panel comprises a plurality of protrusions adjacent one side of the openings, each of the protrusions comprises an open side facing the opening, and the cover comprises a plurality of tabs extending through the open sides of the protrusions.

14. The mounting apparatus for at least one data storage device as described in claim 10, wherein the front panel comprising a plurality of clips adjacent the opening, and the at least one drive bracket defining a plurality of slots engagingly receiving the clips therein thereby attaching the at least one drive bracket to the front panel at the opening.

15. The mounting apparatus for at least one data storage device as described in claim 14, wherein a plurality of recessed portions is formed in the at least one drive bracket near each of the slots, each of the recessed portions defines a cutout and comprises a guide slant extending into the cutout, a projection is formed on each of the clips of the front panel, the projections engaging with the at least one drive bracket at corresponding cutouts thereof.

16. The mounting apparatus for at least one data storage device as described in claim 15, wherein the at least one drive bracket further comprises a plurality of slanted portions respectively formed at the slots, a notch is defined in each of the slanted portions, and each of the clips of the front panel comprises a small block engagingly received in a corresponding notch.

17. A mounting apparatus assembly comprising:
    a panel defining a rectangular opening with a plurality of protrusions located on a periphery of said opening;
    a U-shaped drive bracket located behind said opening in a face-to-face linearly assembling way with latching devices releasably engaged with the corresponding protrusions, respectively;

a cover pivotally detachably fixed to both said drive bracket and said panel;

said cover cooperating with said drive bracket to define a surrounded space; and a data storage device compliantly received in said space; wherein interlocking means formed on both said data storage device and said cover to retain said data storage device in said space without movement in a front-to-back direction.

18. The assembly as described in claim 17, wherein said drive bracket defines opposite top and bottom plates with a side plate connected therebetween and facing to said cover, and said interlocking devices are disposed on said side plate.

19. The assembly as described in claim 17, wherein the data storage device is assembled to the drive bracket in a direction perpendicular to said front-to-back direction.

* * * * *